United States Patent
Gardner et al.

(10) Patent No.: US 7,670,660 B2
(45) Date of Patent: Mar. 2, 2010

(54) COMPOSITE SECONDARY CARPET BACKING, METHOD OF MANUFACTURE THEREOF, AND CARPET MADE THEREFROM

(75) Inventors: Hugh C. Gardner, Roswell, GA (US);
Thomas L. Baker, Winston, GA (US);
Richard C. Moon, Dalton, GA (US);
Robert J. White, Ringgold, GA (US);
James E. Haire, Colquitt, GA (US);
Charles W. Galpin, Bainbridge, GA (US)

(73) Assignee: Propex Operating Company, LLC, Chattanooga, TN (US)

( * ) Notice: Subject to any disclaimer, the term of this patent is extended or adjusted under 35 U.S.C. 154(b) by 363 days.

(21) Appl. No.: 11/362,700

(22) Filed: Feb. 27, 2006

(65) Prior Publication Data
US 2006/0204712 A1    Sep. 14, 2006

Related U.S. Application Data

(60) Provisional application No. 60/657,042, filed on Feb. 28, 2005.

(51) Int. Cl.
*B32B 33/00* (2006.01)
*D05C 17/02* (2006.01)
*D04H 1/48* (2006.01)

(52) U.S. Cl. .................. 428/95; 442/185; 442/208; 442/270

(58) Field of Classification Search .............. 428/95; 442/185, 208, 209, 268, 270
See application file for complete search history.

(56) References Cited

U.S. PATENT DOCUMENTS

| 3,551,231 A | | 12/1970 | Smedberg |
| 3,605,666 A | * | 9/1971 | Kimmel et al. ............. 112/410 |
| 3,684,600 A | | 8/1972 | Smedberg |
| 3,745,054 A | | 7/1973 | Smedberg |
| 3,817,817 A | | 6/1974 | Pickens, Jr. et al. |
| 3,914,489 A | | 10/1975 | Smedberg |
| 3,922,454 A | * | 11/1975 | Roecker ..................... 428/95 |
| 4,053,688 A | * | 10/1977 | Perkins et al. ............... 429/98 |
| 4,069,361 A | | 1/1978 | Kumar |
| 4,406,310 A | * | 9/1983 | Reader et al. .......... 139/420 R |
| 4,822,658 A | * | 4/1989 | Pacione ....................... 428/95 |

(Continued)

FOREIGN PATENT DOCUMENTS

GB          971958         10/1964

OTHER PUBLICATIONS

Dupont, "Specialty Technologies: Uniplex™ Spun Yarn Technology", copyright © 2003, 6 pgs.

(Continued)

*Primary Examiner*—Cheryl Juska
(74) *Attorney, Agent, or Firm*—Lawrence A. Steingold

(57) ABSTRACT

A two-layer secondary carpet backing including a woven scrim layer and a fibrous layer is described. The woven scrim layer is characterized as having a low open area and a flat weave. The two-layer secondary backing is capable of having a non-abrasive, textile back surface. The secondary carpet backing is also capable of having a construction that permits high carpet manufacturing speeds due to high air permeability and is capable of providing high dimensional stability, seam strength, and delamination strength to tufted carpets made therefrom.

6 Claims, 8 Drawing Sheets

U.S. PATENT DOCUMENTS

| | | | | |
|---|---|---|---|---|
| 5,470,648 | A | * | 11/1995 | Pearlman et al. ............... 442/26 |
| 6,060,145 | A | | 5/2000 | Smith et al. |
| 6,344,254 | B1 | | 2/2002 | Smith et al. |
| 6,740,385 | B2 | * | 5/2004 | Gardner et al. ................ 428/85 |
| 6,849,565 | B1 | | 2/2005 | Gardner et al. |
| 7,018,492 | B1 | * | 3/2006 | Mumm et al. ................. 156/72 |
| 7,115,315 | B2 | * | 10/2006 | Fowler ........................ 428/95 |
| 2002/0172795 | A1 | * | 11/2002 | Gardner et al. ................ 428/85 |
| 2004/0091664 | A1 | * | 5/2004 | Gardner et al. ................ 428/85 |
| 2004/0142142 | A1 | | 7/2004 | Gardner et al. |
| 2005/0053760 | A1 | * | 3/2005 | Fowler ........................ 428/95 |
| 2005/0147787 | A1 | * | 7/2005 | Bailey et al. .................. 428/95 |
| 2005/0287334 | A1 | * | 12/2005 | Wright et al. ................. 428/95 |
| 2006/0204711 | A1 | * | 9/2006 | Mumm et al. ................. 428/95 |
| 2006/0270295 | A1 | * | 11/2006 | Fowler ........................ 442/208 |
| 2007/0082173 | A1 | * | 4/2007 | Gardner et al. ................ 428/95 |
| 2007/0178790 | A1 | * | 8/2007 | Gardner et al. ............... 442/190 |
| 2008/0017294 | A1 | * | 1/2008 | Bailey et al. .................. 156/72 |

OTHER PUBLICATIONS

Sudnik, "Dimensional Stability of Carpets: Rucking of Carpets in Use," Textile Inst. and Ind., Oct. 1969, pp. 278-281.

Gentry, "The Dimensional Stability of Carpets in Installations, Part 1: Stability of Mechanical Actions," Textile Research Journal 47, Jul. 1977, pp. 459-463.

International Search Report for International Application No. PCT/US2006/06831 dated Aug. 17, 2007, 1pg.

* cited by examiner

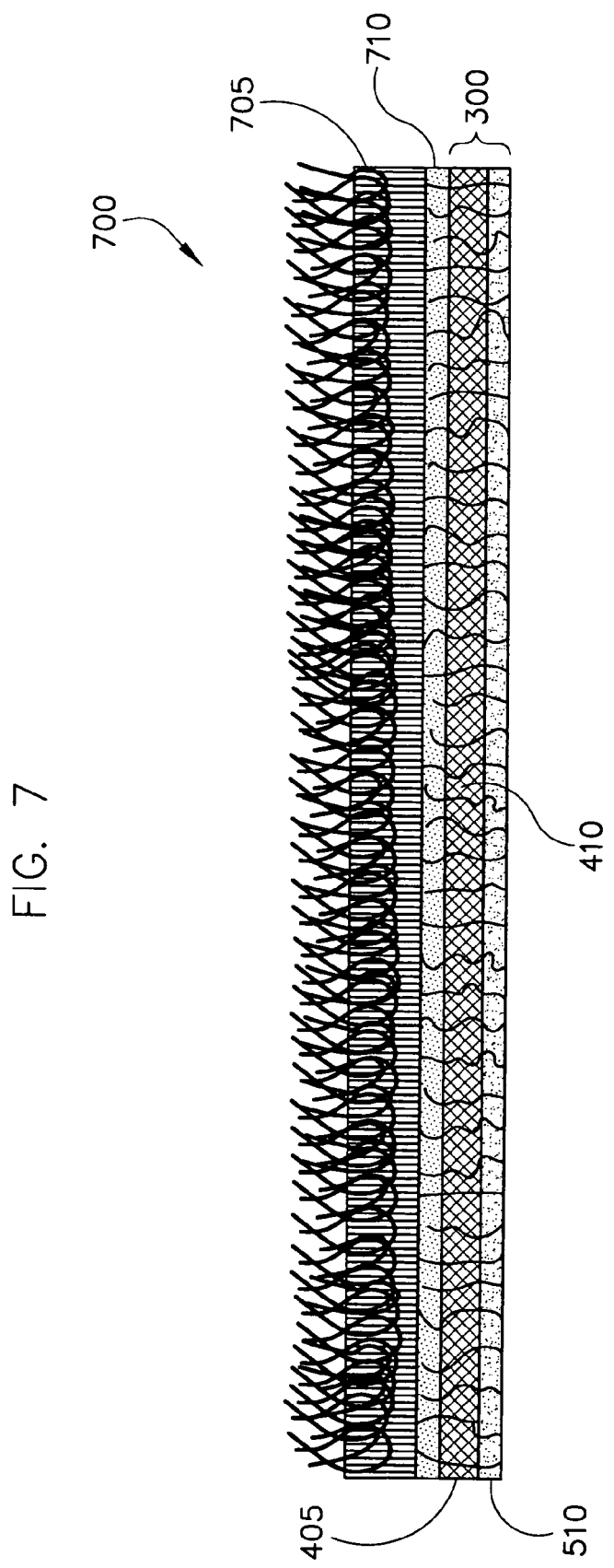

COMPOSITE SECONDARY CARPET BACKING, METHOD OF MANUFACTURE THEREOF, AND CARPET MADE THEREFROM

RELATED APPLICATION

The present application claims priority under 35 U.S.C. §119(e) based upon U.S. Provisional Patent Application No. 60/657,042 entitled, "Composite Secondary Backing, Method of Manufacture Thereof, and Carpet Made Thereof," filed on Feb. 28, 2005. The complete disclosure of the above-identified priority application is hereby fully incorporated by reference.

FIELD OF THE INVENTION

The present invention relates generally to carpet backing materials, and more specifically to a composite secondary carpet backing having two layers, wherein one layer comprises a woven fabric layer having a flat weave construction and a low degree of open area. The composite secondary carpet backing is suitable for high carpet manufacturing speeds and imparts dimensional stability and delamination resistance to a carpet structure.

BACKGROUND OF THE INVENTION

Carpets generally comprise a primary backing structure, face yarn, a binder and, in many cases, a secondary carpet backing. Face yarn penetrates the primary backing structure to form tufts projecting from one side, providing a pile surface, and stitches on an opposite side. Binder is present on the stitched side, encapsulating and adhering stitches to the backing structure to anchor the tufts. Secondary carpet backings normally are adhered to the stitched side with the binder. The binder typically comprises more than 80 percent by weight of a ground inorganic solid such as calcium carbonate in a styrene butadiene or ethylene vinyl acetate latex.

Carpets are typically fabricated by tufting face yarn through a primary backing structure with reciprocating needles that carry face yarn back and forth through the structure to form the tufts and stitches, applying a binder formulation, usually as an inert particulate-filled aqueous latex of an organic polymer, to the stitched side, and curing the binder by heating to drive off water or other liquids. The secondary carpet backing usually is laminated to the stitched side, by bringing it and the stitched side of the tufted structure together with binder applied to the stitched side, or with binder applied both to the stitched side of the primary backing structure and to the secondary carpet backing, and curing the binder in contact with the stitched side and the secondary carpet backing. Curing, also commonly referred to as drying, typically involves heating the construction with hot air, as in a carpet finishing oven.

In carpet manufacture, the secondary carpet backing performs several functions. Typically, it imparts dimensional stability to the finished carpet and increases tuft bind. Dimensional stability is the ability of the carpet to resist buckling in use after stretch in. Generally dimensional stability increases when the force required to separate (or peel) the secondary carpet backing from the binder increases. Another carpet performance issue is ease of seaming. The secondary carpet backing must allow the carpet to be joined with seaming tape without distorting the face appearance while forming strong bonds that can withstand installation with a power stretcher. In addition to its contribution to carpet performance, the secondary carpet backing provides aesthetics and, in some cases, isolates the abrasive binder/filler mixture that is used to bind the stitches from the underside of the carpet. Isolating the abrasive binder/filler mixture is important for minimizing scratches to walls and woodwork during installation.

For commercially viable secondary carpet backings, the fabrics must also meet critical requirements in the carpet manufacturing process. For example, the backings must have sufficient integrity that they can be unrolled, coated and laminated to the back of the carpet without significant distortion of the pick line. They must also allow the carpet to be manufactured at line speeds that result in low laminating costs. One carpet backing property that correlates with faster line speeds is air permeability. Consequently, during curing (or drying) of the binder/filler mixture, the backing must not act as a barrier preventing escape of volatilized liquids. Carpets that have incompletely cured binders have less resistance to delamination, lower dimensional stability, and lower tuft binds, and lower resistance to moisture than equivalent carpets with fully cured binders.

These considerations dictate that the ideal secondary carpet backing must satisfy many different requirements. Among others, it must be capable of imparting dimensional stability, forming a strong bond to the carpet binder and to carpet seaming tape, allowing a fast carpet lamination process, and preventing the abrasive binder/filler mixture from causing damage.

Designing secondary carpet backings that meet all of these requirements is complicated, since the structural features that are conducive to good drying (i.e., an open structure) may be in conflict with the features for containing the filler and imparting increased dimensional stability. Studies performed by the inventors have shown that with the conventional leno weave secondary carpet backings that are in use today, it is not possible to predict with certainty the exact contribution of a secondary carpet backing to the dimensional stability of finished carpets because of the wide range of styles, weights and other characteristics of carpets in which secondary carpet backings are utilized. The inventors have also found the interactions of backings and binders within finished carpets when subjected to force are not well defined. Indeed, systematic studies of common secondary carpet backings have shown a lack of correlation between dimensional stability of finished carpets and the properties of the carpet backing fabrics therein, suggesting that the ability of such backings to impart dimensional stability is best gauged from carpet performance itself.

Leno weave is a weave in which the warp yarns are arranged in pairs which are twisted around the filling yarns. The most common secondary carpet backing in use today is an open weave fabric with a leno weave construction and a warp count of 16 ends per inch (wpi) and a fill count of 5 picks per inch (ppi). That product has polypropylene tape yarns in the warp direction and spun yarn in the filling direction. It combines low cost with the ability to provide adequate dimensional stability and delamination strengths in carpets that are manufactured at high line speeds. However, one drawback of using an open weave secondary carpet backing is that the binder/filler mixture is exposed on the underside of the finished carpet. This causes the back side of the carpet to have an unattractive appearance and abrasive texture due to the exposed filler/binder mixture. This abrasive, tough cured binder mixture often causes scratches on walls and woodwork when such carpets are installed.

FIG. 1 exemplifies a conventional leno weave construction. This conventional art does not constitute an admission of priority or that this figure is available as a reference against applicants' technology, or a waiver of any right the applicant may have under applicable statutes or Rules of Practice. As depicted, the construction 100 comprises warps 130 and wefts 120 disposed in a 16 warps per inch (wpi) by 5 picks per inch (ppi) leno weave construction. This provides a substantially open construction allowing for proper air permeability for drying of binding agents applied during carpet construction. For example, the open area of a 16×5 leno weave backing is about 34%. However, while allowing for proper air permeability, the open fabric design also allows the filler/binder mixture to exude from the back of the carpet. This creates an abrasive surface that is often unsatisfactory because of its appearance and tendency to scratch surfaces during installation.

Several approaches to overcoming the abrasiveness and poor aesthetics of the conventional leno 16×5 secondary carpet backing/filled binder system have been proposed. One approach is to increase the warp count and pick count of the 16 wpi by 5 ppi leno weave backing to about 18 wpi by 13 ppi. Although that approach reduces the size of the open areas in the fabric, the open areas are still sufficiently large that the filled binder mixture exudes through the secondary carpet backing during carpet manufacture.

Another approach is to make a secondary carpet backing that has a closed weave so that the filler/binder mixture is encapsulated between the stitched side of the primary backing and the side of the secondary carpet backing that is opposite the side that contacts the floor. One such product of that type is a 24 wpi×15 ppi plain weave fabric woven from 50 mil wide tapes in the warp direction and 40 mil diameter spun yarns in the filling direction. That fabric weighs about 4 ounces per sq yd (osy) and has essentially no open area, that is, no space in the plane of the fabric that is not occupied by a warp or fill yarn. Although that fabric prevents the filler/binder mixture from exuding to the underside of the carpet when it is cured, it does not allow for sufficiently high curing rates for widespread use. Consequently, it has been withdrawn from commercial use.

One key measure related to curing rates is the air permeability of fabric. For the above described 24×15 plain weave fabric, the air flow rate is 80 cfm/sq ft when measured according to ASTM D 737 with a 0.5 inch water head. That figure is about one tenth the air permeability of the conventional 16×5 leno weave secondary carpet backing described above.

Other approaches to improved secondary carpet backings have been proposed. One class of alternative secondary carpet backing constructions involves the preparation of composites of two or more layers. One such attempt is disclosed in U.S. Pat. No. 3,817,817 Pickens, Jr. et al. ("the '817 Pickens patent") wherein a needlebonded secondary carpet backing for carpet comprises a closed weave fabric needlepunched with staple fiber. This composite backing affords a textile-like back surface that contains the filler/binder mixture, providing improved aesthetics and preventing the carpet from scratching walls and woodwork during installation. However, such a construction has low air permeability, and is not suitable for making carpets at current high line speeds because the water in the latex layer cannot escape at a sufficiently high rate while the carpet is in the oven.

FIG. 2 exemplifies the '817 Pickens patent. As is illustrated, the composite secondary carpet backing comprises warps 230 and wefts 220, wherein warps 230 and wefts 220 comprise thin, wide tapes or tape yarns. The fuzzy side of the fabric is disposed against the floor side of the backing/carpet construct, and the fibers that are punched through the woven fabric become bonded to the latex binder layer. However, the closeness and dimensions of these tape yarns in the '817 Pickens patent does not allow for sufficient water removal during the curing process. Additionally, the '817 Pickens patent does not teach a relationship between the structure of the woven fabric layer and subsequent performance in carpets.

Another composite secondary carpet backing is described in U.S. Pat. Nos. 6,060,145 and 6,344,254 Smith et al. These patents disclose a modified secondary carpet backing having an open weave scrim in a leno weave construction with a 16 wpi by 5 ppi count (16×5), wherein the woven scrim is bonded to a needled batt of fiber. The 16×5 open weave leno scrim described above is essentially the same as the 16 wpi by 5 ppi commonly used in secondary carpet backings as described above.

To create a less abrasive and more aesthetically pleasing carpet, the composite secondary carpet backings of the '145 and '254 patents combine the 16×5 leno construction with a needled batt of fiber. Like the Pickens, Jr. et al. '817 construction, this composite backing also affords a textile-like back surface providing improved aesthetics and preventing the carpet from scratching walls and woodwork during installation.

Thus, the '145 and '254 patents differ from the Pickens, Jr. et al. '817 construction because of the nature of the woven scrims. More specifically, the large open area in the woven scrim of the '145 and '254 patents leads to higher air flow through the composite backing. For example, with a 2.2 osy needled fiber layer, the air flow is about half that of the 16 wpi by 5 ppi fabric alone. This increased air permeability is cited as a key reason for a faster binder curing rate.

However, while the Smith et al. '145 and '254 patents provide increased air permeability over the Pickens, Jr. et al '817 construction, it is common industry knowledge that carpet laminations constructed with the '145 and '254 composite secondary carpet backings proceed at reduced line speeds compared to laminations where the 16×5 open weave fabric is alone the secondary carpet backing. Further, efforts to increase line speed by raising oven temperatures have been largely unsuccessful because the fibers in the nonwoven batt melt at the higher temperatures. These melted sections of the batt lead to poor aesthetics and a non-uniform carpet appearance and can also lead to decreased carpet properties.

Therefore, it is readily apparent that there currently exists a need in the art for a secondary carpet backings that allows for high carpet manufacturing speeds, provides a smooth textile-like surface that prevents the filler/binder mixture from exuding from the underside of the carpet, and imparts high levels of dimensional stability, delamination resistance, air permeability, and tuft binds to carpets.

SUMMARY OF THE INVENTION

Briefly described, in a preferred exemplary embodiment, the inventive secondary carpet backing and carpet made therefrom can overcome the above-mentioned disadvantages and meets the recognized need for such an invention by providing a composite secondary carpet backing, wherein the secondary carpet backing provides increased dimensional stability, increased delamination resistance, and permits higher air permeability to facilitate faster carpet manufacturing speeds. High air permeability can be obtained in concert with a smooth textile-like appearance that prevents the filler/binder mixture from exuding from the underside of the carpet.

In a broader exemplary embodiment, the composite secondary carpet backing of this invention can comprise two layers, wherein the woven fabric layer is a flat weave with a low open area and a fibrous layer weighing about 0.5 to 10 osy that is entangled with the woven fabric so that a portion of the fibers penetrate the fabric and extend outwardly from the reverse side. The composite secondary carpet backing of this invention can have an air flow of at least 220 cfm/sq ft in combination with a woven scrim that has an open area of no more than 15%.

Preferred embodiments of the present invention can comprise plain weave constructions having, for exemplary purposes only, 24 wpi×6 ppi, 28 wpi by 6 ppi, or 16 wpi by 10 ppi, wherein the plain weave may provide no more than 15% open area. Notably, the present invention is neither a leno weave nor an open weave, and thereby is not limited to a 16 wpi×5 ppi construction.

According to its major aspects and broadly stated, the present invention in its preferred form is a class of secondary carpet backings having two layers, wherein the first layer can comprise a nonwoven web or fabric that is needlepunched or hydroentangled to a second layer, and wherein the second layer can comprise a flat weave fabric having a ribbon-like yarn in the warp direction and a bulky or thick yarn in the weft direction. The ribbon-like yarn can comprise a tape yarn. The thick yarn can comprise a multifilament yarn (open end spun yarn, bulk continuous filament yarn, core-spun yarn, or stretch-broken yarn. For example, yarns which may be used as the thick yarn include, but are not limited to, yarns as described in a publication by DuPont entitled "Specialty Technologies: Uniplex™ Spun Yarn Technology), which comprise polyolefin, (such as polyethylene, polypropylene, and/or impact co-polymers of same), polyamide, or polyester (such as, polytrimethylene terephthalate (PTT), polyethylene terephthalate (PET) or polybutylene terephthalate). Further, in an exemplary embodiment, the thick yarn is at least three times thicker than the diameter of the tape yarn.

Both the tape yarns and the spun yarns can entangle with, and can be penetrated by, staple fibers. In the preferred embodiment, some of the fiber or filaments from the nonwoven layer can be transferred through the woven layer and extend outwardly from the opposing face thereof. When utilized as a secondary carpet backing in a finished carpet, the side with the majority of the fiber can be positioned against the floor, and the opposing face, having nonwoven filaments extending therethrough, can be bonded through the latex or other binding agent to the stitched side of the primary backing of the carpet.

More specifically, one exemplary embodiment of the inventive secondary carpet backing in a preferred embodiment may comprise a secondary carpet backing having a 24 wpi by 6 ppi plain weave construction needle-punched with 1 to 1.5 ounce per square yard (osy) of 3-inch long polypropylene fiber, thereby creating a uniform fibrous layer on one side of the plain weave fabric. The combination of 24 wpi of tape yarn and 6 ppi of spun fill yarn in a flat weave construction can create an open area of less than 1% in the woven scrim. The 6 ppi of filling yarn can comprise open end spun yarn with a diameter of about 15 to 20 times the thickness of the tape yarns due to the differential thickness. Gaps can form at the crossovers between the tape yarns and the spun yarns, thereby providing unexpected air permeability for the apparently closed scrim, and overcoming the problem of tape-to-tape crossovers, which can have very low permeabilities.

Also, in a preferred embodiment, the nonwoven side of the composite backing can be heated to lightly bond surface fibers together, thereby creating a glazed surface. The composite backing in this exemplary embodiment can have a total weight of about 3.5 to 3.9 osy and an air permeability of 278 cfm/sq ft, when measured according to ASTM D 737.

Accordingly, one feature and advantage of the present composite secondary carpet backing can include its ability to impart high dimensional stability to a carpet.

Another feature and advantage of the present composite secondary carpet backing can be its ability to impart high delamination resistance to a carpet.

Another feature and advantage of the present composite secondary carpet backing can be its ability to impart high tuft binds to a carpet.

Another feature and advantage of the present invention can be its ability to impart a high seam strength to a carpet.

Another feature and advantage of the present invention can be its ability to impart a carpet with high edge ravel resistance.

Yet still another feature and advantage of the present invention can be that it provides a textile-like, nonabrasive back surface for carpets.

A further feature and advantage of the present invention can be that it prevents the filler/binder mixture from bleeding through.

Yet a further feature and advantage of the composite secondary carpet backing of the present invention can be its high air permeability, which allows increased production speeds when compared to prior art carpets with composite secondary backings manufactured with latex binder formulations.

A further feature and advantage of the present invention can be that it has increased resistance to melting of the fibrous layer compared to similar composites with open leno weave scrims.

These and other features and advantages of the present invention will become more apparent to one skilled in the art from the following description and claims when read in light of the accompanying drawings.

The present invention will be better understood by reading the Detailed Description of the Preferred and Selected Alternate Embodiments with reference to the accompanying drawing figures, in which like reference numerals denote similar structure and refer to like elements throughout.

BRIEF DESCRIPTION OF THE DRAWINGS

FIG. 7 illustrates a side view of an exemplary embodiment of a carpet comprising the inventive secondary carpet backing.

DETAILED DESCRIPTION OF EXEMPLARY EMBODIMENTS

The inventive system can provide an inventive secondary carpet backing comprising two layers in addition to an inventive carpet made therefrom. Further, the secondary carpet backings of this invention may be utilized in broadloom carpet, carpet tiles, rugs, mats, and other floor coverings.

Specific terminology is employed for the sake of clarity in describing preferred embodiments of the present invention. The inventive secondary carpet backing and inventive carpet, however, are not intended to be limited to the specific terminology, and it is understood by one of ordinary skill in the art that each specific element includes all technical equivalents that operate in a similar manner to accomplish similar functions.

Figure 3A:
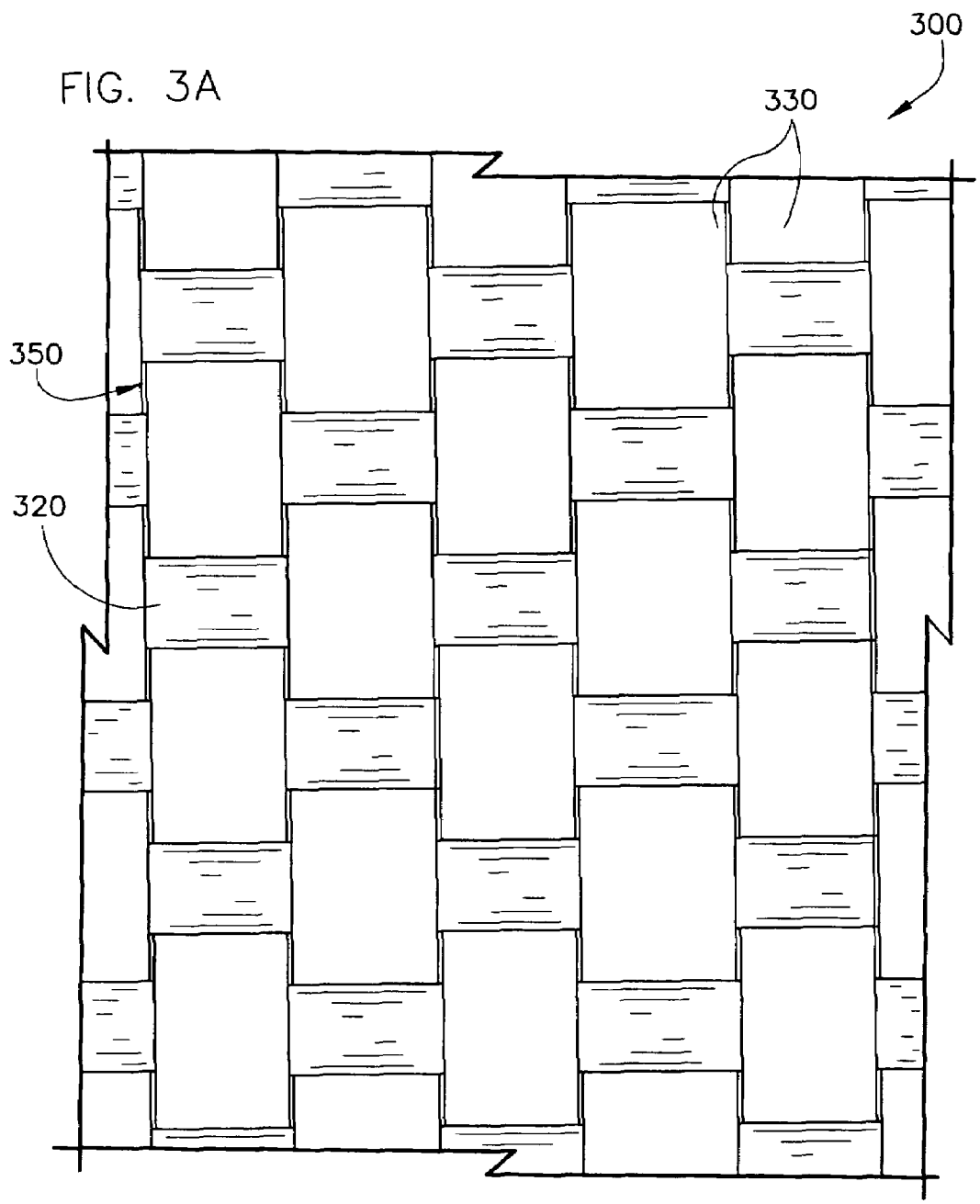
FIGS. 3A through 3D illustrate a preferred embodiment of the woven fabric layer in the inventive composite secondary carpet backing according to one exemplary embodiment of this invention.
Figure 3B:
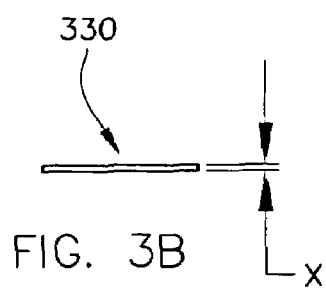
Figure 3C:
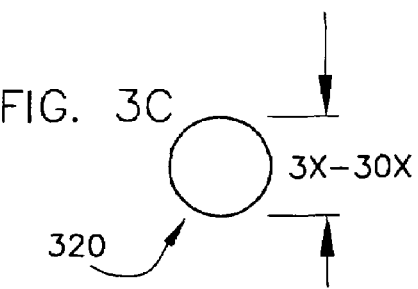

FIGS. 3A through 3C illustrate a preferred, yet exemplary embodiment of the woven fabric layer in the inventive composite secondary carpet backing 300 of this invention. The woven scrim comprises a plain weave of warp yarns 330 and weft yarns (i.e., fill yarns) 320, having a 24 wpi by 6 ppi construction. As illustrated in FIG. 3C, the wefts 320 are substantially thicker than the warps 330. According to one exemplary embodiment, as illustrated in FIGS. 3B and 3C, the wefts 320 can be three times thicker than the warps 330, where the thickness is denoted by the "X" reference. This construction can create a low open area (<1%), however, allowing the secondary carpet backing to have an unexpectedly high air permeability (>220 cfm/sq ft).

Figure 3D:
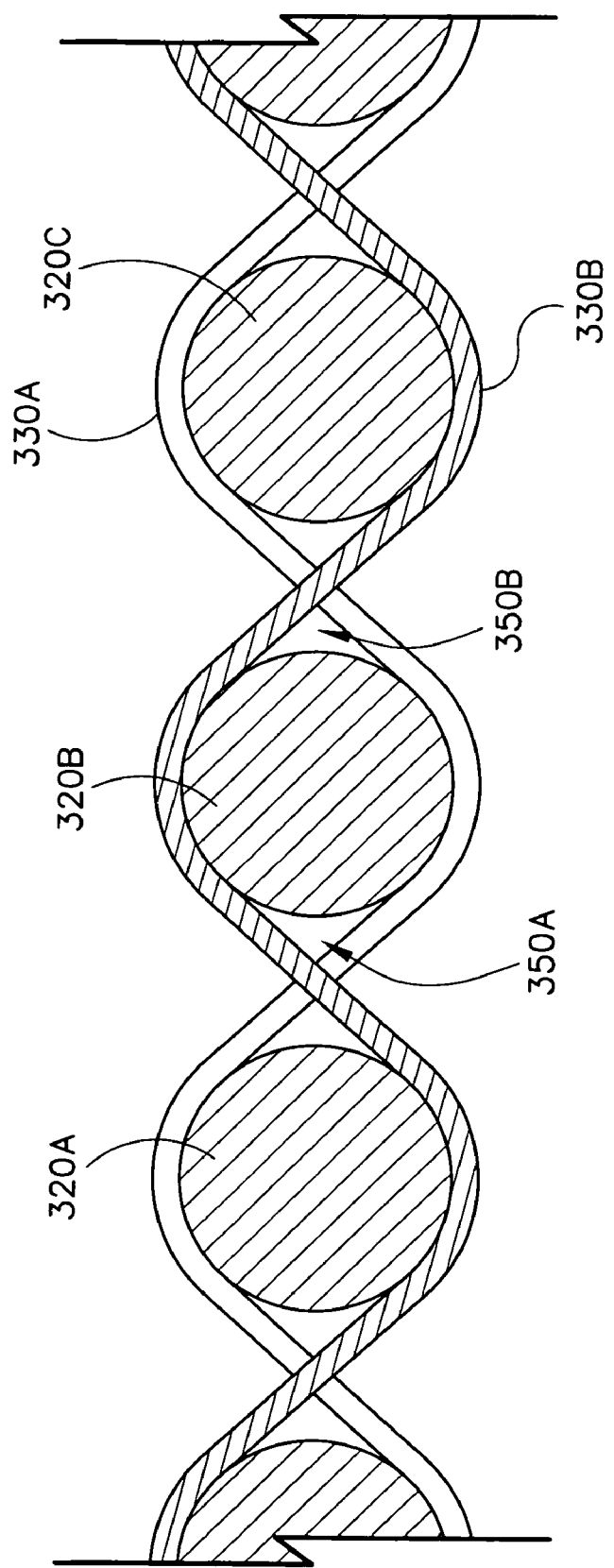

As illustrated in FIG. 3D, a warp yarn 330 and wefts 320A-B form gaps 350A and 350B at their cross-overs, wherein the gap 350 provides air permeability of the inventive secondary carpet backing 300. In one preferred, yet exemplary embodiment, the needle-punched secondary carpet backing 300 may be held on a tenter frame and heated to glaze the fibrous surface and lock the fibers together.

Figure 4:
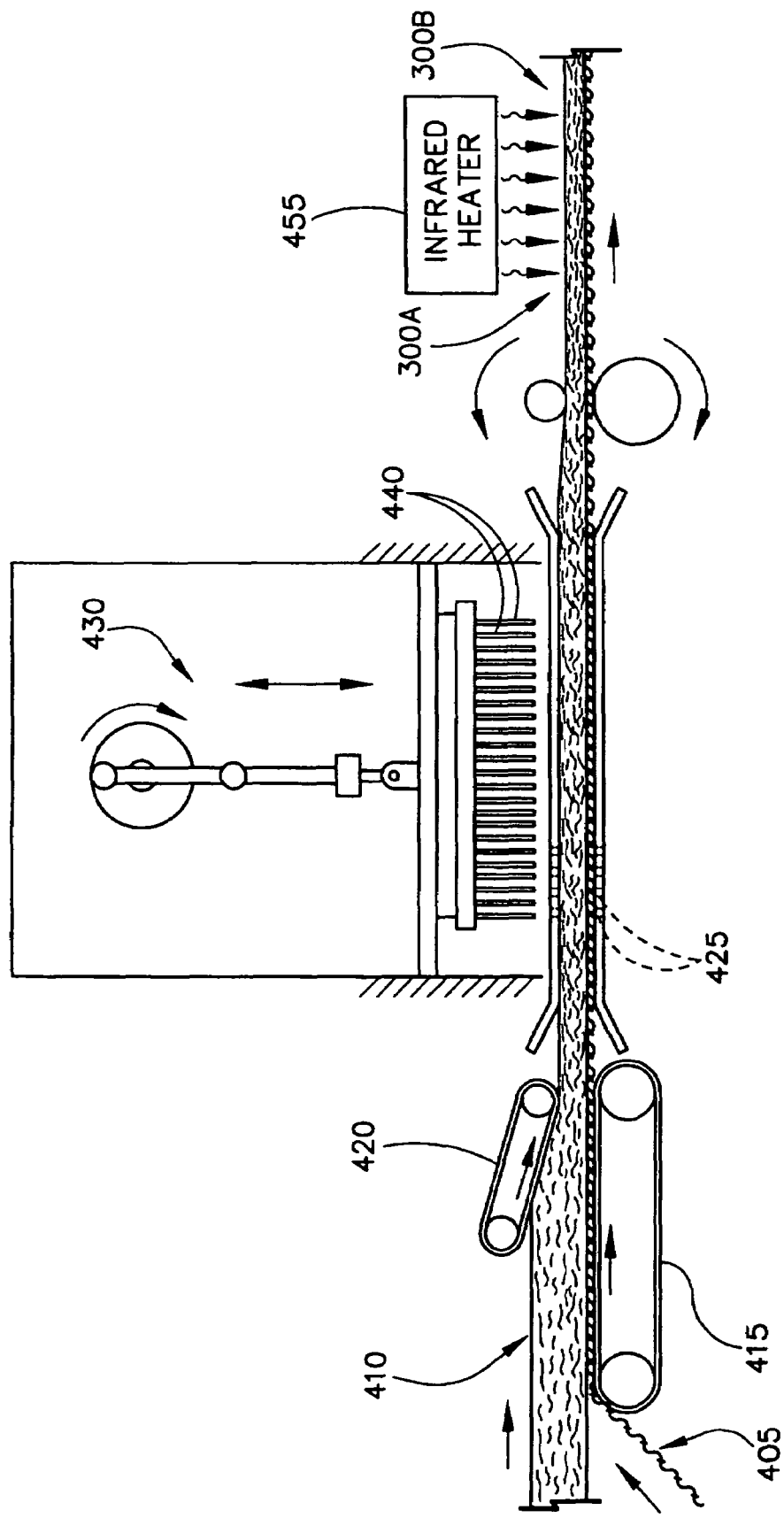
FIG. 4 illustrates a side view of a system for the manufacture of the composite secondary carpet backing according to one exemplary embodiment of this invention.

FIG. 4 illustrates a diagram of a system for needle-punching a batt of staple fiber 410 to a woven fabric layer 405. The batt of staple fiber 410 and the woven fabric layer 405 are transported on a moving belt 415 to a needle-loom 430 to form a composite secondary carpet backing 300A. The needles 440 consolidate the batt of staple fiber 410 by mechanical entanglements and drag a portion of the fibers 410 through the woven fabric layer 405 to the opposite side 425. The needled composite secondary carpet backing 300A may be used as is, or optionally is passed under an infrared heater 455 to create a secondary carpet backing 300B with a glazed surface. Either secondary carpet backing 300A or 300B will eventually become the bottom surface of a carpet, depending on whether a glazed surface is desired.

For the needling process, single barbed needles 440 as well as needles 440 with a higher number of barbs may be used. A compaction belt 420 may be used to press down the fiber batt 410 prior to needling, especially if the batt weight is more than 2 osy. At low batt weights, a compaction belt 420 is not needed. The fibers in the batt 410 can be distributed randomly or with a preferred orientation depending on the process used for depositing them on the woven fabric. A requirement is that a portion of the fibers 410 must be pushed through the woven fabric 405 so that the fibers 410 can entangle in the filler/binder mixture when the secondary carpet backing 300 is used to form a carpet. Specifically, the portion of fibers 410 that penetrate and extend to the obverse side of the woven fabric layer 405 should be at least about 5% by weight and no more than about 95% by weight, preferably about 20% to 70%.

Details of making the needlepunched composite fabrics are well known to one of ordinary skill in the art. Further, U.S. Pat. Nos. 4,069,361 and 6,344,254 address the main considerations for needlepunching staple fibers into woven fabric substrates. Accordingly, U.S. Pat. Nos. 4,069,361 and 6,344,254 are hereby incorporated herein by reference.

Figure 5:
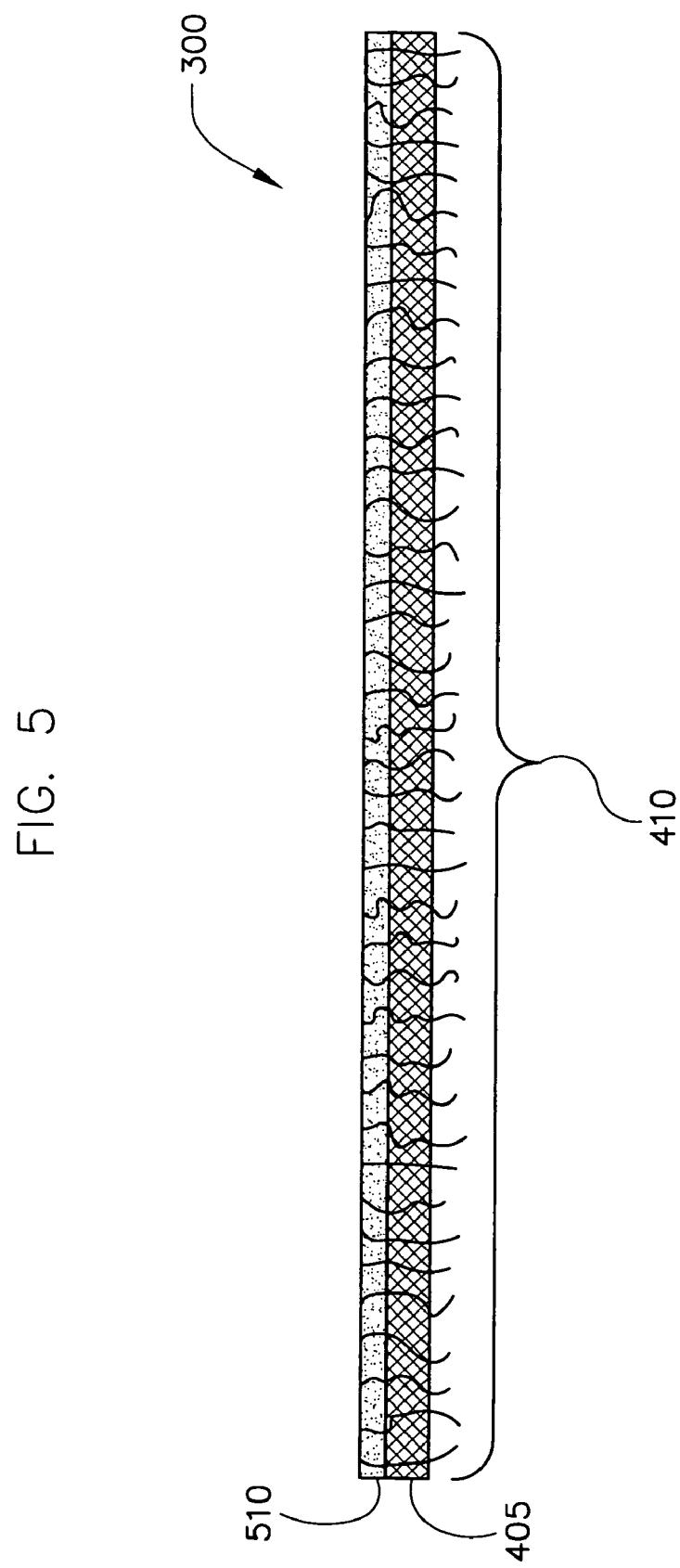
FIG. 5 is a side profile of the inventive secondary carpet backing according to one exemplary embodiment.

Entangling of the fibers 410 with the woven fabric 405 can be done by any means known in the art, including, but not limited to, needle-punching and hydro-entangling. A requirement is that a portion of the fibers 410 be transferred to the opposite side 425 of the woven fabric 405 as a result of the entangling process. FIG. 5 illustrates how a portion of fibers 410 may be transferred to the opposite side of the woven fabric 405 layer according to one exemplary embodiment of the inventive secondary carpet backing 300. As illustrated, the fibers 410 on at least one face should extend outward so that they can bond with the binder resin that contacts the opposite face. The optional step of fusing the fiber surface may be carried out on a heated roll instead of by application of infrared heat.

Referring now to FIG. 5, the inventive secondary carpet backing 300 of this invention may comprise two layers—a woven fabric layer 405 comprising a special construction and a fibrous layer 510 comprising a weight of about 0.5 to 10 osy and also comprising staple fiber 410 that is entangled with the woven fabric layer 405 so that a portion of the fibers 410 penetrate the woven fabric layer 405 and extend outwardly from the reverse side of the woven fabric layer 405. More specifically, the fibrous layer 510 may be formed by depositing the batt of fibers on to the woven fabric layer 405 and transporting (through hydro-entangling, needle-punching, or other means known to one of ordinary skill in the art) a portion of the fibers 410 in the batt to the opposite side of the inventive secondary carpet 300 during the manufacturing process so that the fibers 410 will interact with binder if the inventive secondary carpet backing 300 is attached to a primary backing to form an inventive carpet.

As discussed above, distinguishing characteristics of the woven fabric layer 405 are a flat weave and low open area. The term flat weave refers to plain weaves, twill weaves, and satin weaves, as well as their derivatives, which include basket weaves and herringbone weaves. Plain weave constructions have a regular pattern of warp and fill yarns alternating over and under each other. Basket weaves are similar, except that the over and under alternation of warp and fill yarns involves more than one of either or both of the warp and fill yarns. Leno weaves, which by definition require that pairs of warp yarns twist around fill yarns, are distinct from flat weaves.

Open area is a measure of the area in the plane of the fabric that is not obstructed by yarns. Open area is reported as a percentage of the total fabric area. Open areas form between adjacent warp yarns and between adjacent fill yarns. Twisting of flat ribbon-like yarns, as in leno weave fabrics, leads to an increased open area compared to a similar construction in which the yarns are flat and parallel. The open area was measured by taking a photograph of a representative area of the fabric (about 1 inch by 1 inch) using a low magnification microscope. An 8-inch by 10-inch photograph is printed, inspected, and the open areas cut out using a razor knife. To calculate open area, the weight of the cut out areas is compared to the weight of the photograph of the total fabric area. Alternatively, the photograph can be examined using image analysis computer software.

The open area of a fabric is related to its warp and fill yarn counts and their dimensions. Open area is the opposite of coverage. The theoretical coverage of the warp or fill yarns can be calculated by multiplying the wpi or ppi by the yarn width. For example, for a 100 mil wide warp tape yarn in a construction of 8 wpi, the theoretical warp coverage is (8 wpi×0.100 in)×100=80%. This leads to an open area in the warp direction of 100−80=20%. If the fabric had 6 ppi of yarns with an average diameter of 40 mils (0.040 inches), the fabric would have a theoretical fill coverage of (6×0.040 inches)×100=24%. Those yarns would take up 24% of the open area in the warp direction, leading to an open area in the fabric of 20%×(1−0.24)=15.2%. For the woven fabrics of this invention, the open area is 15% or less and, preferably, 12% or less. Further, as is understood by one of ordinary skill in the art, the above calculation is just one example of an area calculation; accordingly, as is also understood, many combinations of warp yarn counts and fill yarn diameters may be utilized in a similar calculation to arrive at the open area of a fabric. Further, as is recognized by one of ordinary skill in the art, warp and fill yarn counts and diameters may be altered in order to obtain varying degrees of open area in a secondary carpet backing.

One feature of the yarns in the woven fabric layer 405 of the inventive secondary carpet backing 300 of this invention is that the warp yarn 330 and fill (i.e., weft) yarns 320 have differing thickness. According to one exemplary embodiment illustrated in FIG. 3C, the fill yarn 320 diameter is at least 3 to 30 times greater than the warp yarn 330 thickness and, preferably, at least five times greater than the thickness of the ribbon-like warp yarn 330 so that an air gap 350 can form at the crossover points. The air gap 350 that is formed at this crossover according to one exemplary embodiment is illustrated in FIG. 3D. It should be noted that the above exemplary embodiment is for illustrative purposes only; accordingly, one of ordinary skill in the art recognizes that an air gap 350 may be formed in a secondary carpet backing where the warp yarns 330 are thicker than the fill yarns 320.

Another benefit and feature of the inventive secondary carpet backing 300 of this invention is that, when a secondary carpet backing is constructed according to one exemplary embodiment, the structure has virtually no exposed open area. However, the construction of the woven fabric in the inventive secondary carpet backing allows air to pass through the gaps 350 between the yarns while holding back the filler/binder mixture. This leaves a soft, textile-like appearance that is less prone to scratching woodwork and walls.

The number of warp ends per inch and picks per inch in the woven fabric is not critical as long as the requirements for open area and air permeability are met. According to an exemplary embodiment, warp counts and pick counts may be in the range of 3 to 40 per inch, preferably 10 to 30 per inch for warp counts and 4 to 15 per inch for pick counts. Specific preferred constructions are 24 wpi by 5 to 7 ppi; 28 wpi by 5 to 7 ppi, and 16 by 10 to 14 ppi. The theoretical warp coverage with tape yarns can be from 50% to 150%.

In these preferred constructions, the warp yarns 330 comprise tape yarn while the fill yarns comprise spun yarn. Polymers used to make the tapes and fill yarns include polypropylene, polyester (PET and PTT), polyamide, polyethylene, polyamides, and acrylics. Polypropylene, PET, and PTT are most preferred.

Tape yarns are normally ribbon-like with a rectangular, serrated, fibrillated, oval, or other cross sectional shapes. They typically lay flat in the fabric or may be folded or twisted. Tapes with low ratios of width to thickness (e.g. 1 to 2), or round cross sections, may also be utilized. Tapes are frequently used as warp yarns, although in some secondary carpet backings they may also be used as fill yarns. Bulky filament yarns that are typically used as fill yarns are open end spun yarns, ring spun yarns, bulked continuous filament yarns, core-spun yarns (i.e., tapes or monofilaments that are wrapped with staple fiber), and stretch-broken yarns. Preferred yarns are made with polypropylene, polyester (PET and PTT), polyamide, and polyethylene. Preferred yarn types are open end spun yarns, twisted bulked continuous filament yarns, and core-spun yarns with high tenacity, low shrinkage polyester continuous filament core yarns and polyester staple fiber sheath fibers. Typical deniers for the tapes and filament yarns are 200 to 5000, preferably 350 to 3000.

The staple fibers 410 that form the fibrous layer in FIG. 4 may have deniers of about 1 to 100 and cut lengths of about 0.5 to 6 inches. The fibers can be round, trilobal, or of any cross sectional shape. They can be made of one material or bicomponent. Preferred fibers include polypropylene, polyester (PET and PTT), polyamide, and polyethylene fibers. The fibers may also have other features, such as flame resistance, anti-static, or anti-microbial properties. Blends of fibers may also be utilized. Typical flame resistant fibers include modacrylic fibers such as Protex M from Kaneka or Visil modified rayon fiber from Kemira Oy. Natural as well as synthetic fibers may be utilized. Although the second layer of the composite backing has been described as a batt of staple fibers, it is also contemplated to be a preformed nonwoven fabric that is attached to the woven fabric layer by a needlepunching or hydro-entangling process.

One unexpected feature and benefit of the present invention is that the addition of a low weight of fiber to a plain weave fabric such as one with a 24 wpi by 6 ppi construction significantly increases the resistance of the secondary backing to distortion during carpet manufacture. Without a fiber cap, the pick line of a 24 wpi by 6 ppi fabric is easily distorted when it is unrolled and spliced to other fabrics. This characteristic can make it hard for carpet mills to use this woven fabric by itself during the lamination process. It has been found that needlepunching 1 to 1.5 osy of polypropylene fiber to the woven fabric makes the pick line much less prone to bowing and skewing, allowing the needlepunched composite to maintain a straight pick line perpendicular to the lengthwise direction during carpet manufacture. In a woven fabric, bow and skew are deviations of filling yarns. Bowing occurs when the filling yarns are disposed in the shape of an arc instead of straight across the fabric. Skewing occurs when the filling yarns are not perpendicular to the edge of the fabric but instead are diagonally offset. In the case of a similar fabric—a 24 wpi by 6 ppi fabric with a leno weave instead of a flat weave—no such fiber cap is needed to achieve an acceptable level of fabric stability.

Another unexpected feature and benefit of the composite secondary carpet backing of this invention is that it is more resistant to damage due to excursions in temperature during carpet manufacturing than a prior art composite secondary backing with a leno weave open scrim. As shown in the examples that follow, the secondary carpet backing composite of this invention was not damaged by being passed through a hot carpet oven, but an analogous composite secondary carpet backing with a 16 wpi by 5 ppi leno weave open scrim suffered nonuniform fiber melting. The unique construction of the woven fabric of this invention, which creates numerous uniformly distributed small passages allowing moisture egress, prevented localized melting of the fiber cap, leading to a carpet with an attractive, non-abrasive, and uniform backing surface.

One preferred, yet exemplary embodiment of the inventive secondary carpet backing in a preferred embodiment may comprise a secondary carpet backing having a 24 wpi by 6 ppi plain weave construction needle-punched with 1 to 1.5 ounce per square yard (osy) of 3-inch long polypropylene fiber, thereby creating a uniform fibrous layer on one side of the plain weave fabric. The combination of 24 wpi of tape yarn and 6 ppi of spun fill yarn in a flat weave construction can create an open area of less than 1% in the woven scrim. The 6 ppi of filling yarn can comprise open end spun yarn with a diameter of about 15-20 times the thickness of the tape yarns. Also, the nonwoven side of the composite backing can be heated to lightly bond surface fibers together, thereby creating a glazed surface. Further, the composite backing in this exemplary embodiment can have a total weight of about 3.5 to 3.9 osy and an air permeability of 278 cfm/sq ft, when measured according to ASTM D 737.

Figure 6:
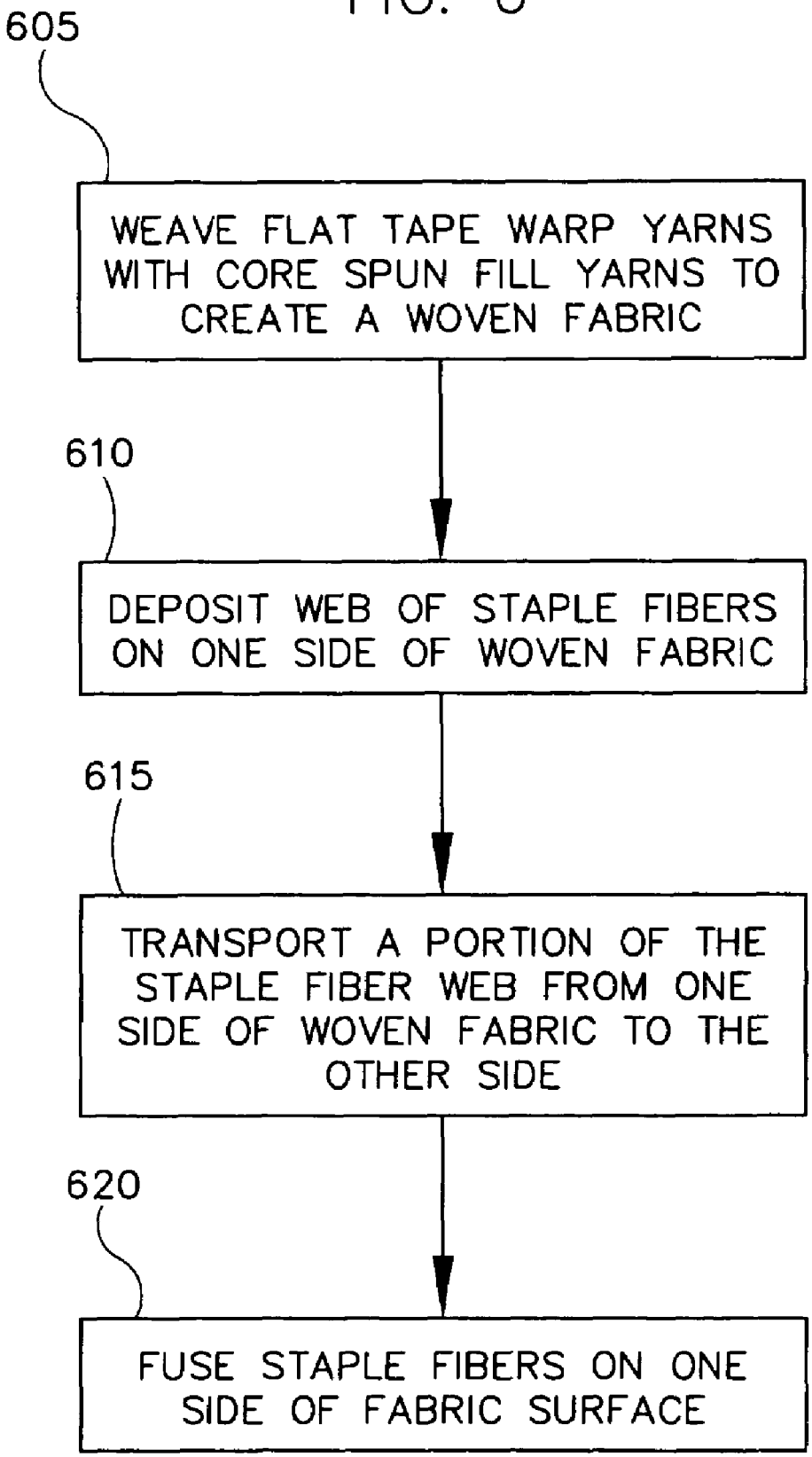
FIG. 6 is a flow chart describing an exemplary method for making the inventive secondary carpet backing according to one exemplary embodiment.
Figure 1:
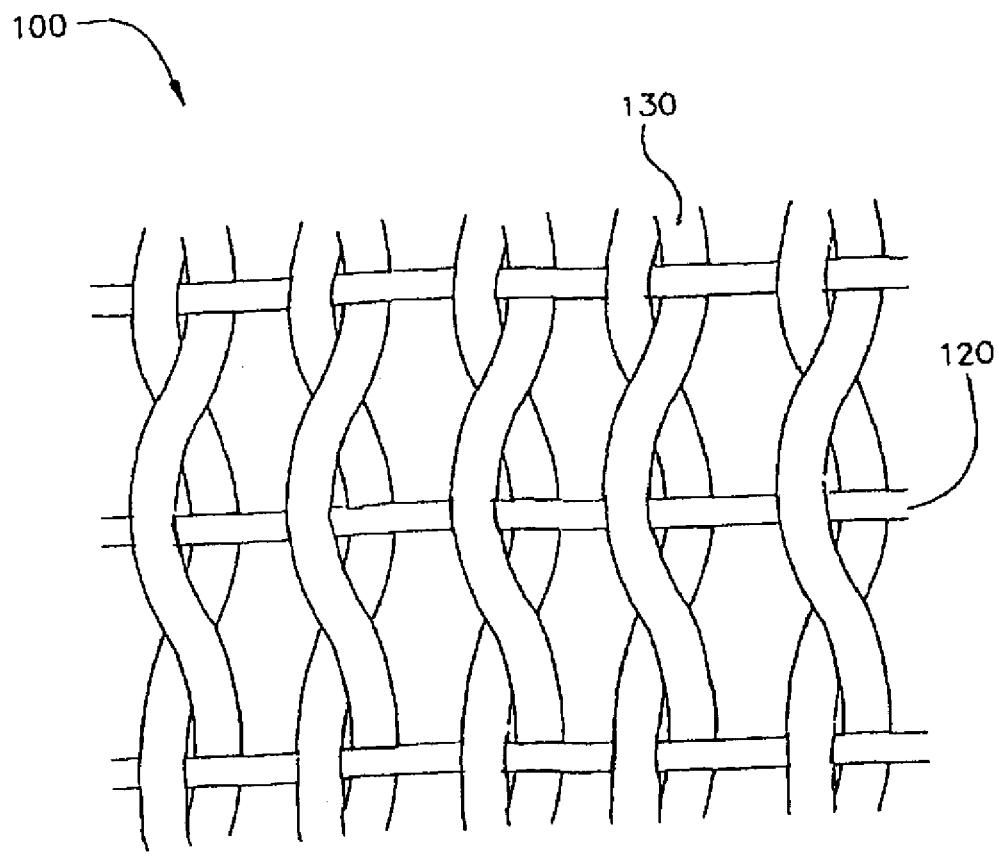

Referring now to FIG. 6, a method for making one exemplary embodiment of the inventive secondary carpet backing 300 of this invention is illustrated. In step 605, a woven fabric layer 405 is created by weaving flat tape warp yarns 330 with core-spun fill yarns 320. In step 610, a batt of staple fiber 410 is entangled with the woven fabric layer 405. In step 615, a portion of the staple fibers 410 are transported from one side of the woven fabric layer 405 to the other. In step 620, the fibrous layer 510 of the inventive secondary carpet backing 300 may be glazed by fusing the surface of the staple fibers 410 together under an infrared heater 455. However, staple fibers 410 that extend from one side of the woven fabric layer 405 are not fused together, but remain capable of bonding the inventive secondary carpet backing 300 with a binder layer and a tufted primary backing such that an inventive carpet may be formed.

In addition to composite secondary carpet backings, the present invention also includes carpets 700 comprising the inventive composite secondary carpet backing 300. As illustrated in FIG. 7, carpets 700 of the present invention may comprise a tufted primary backing layer 705, a binder layer 710, and an inventive secondary carpet backing 300. As shown, the inventive secondary carpet backing 300 comprises a fibrous layer 510 and a woven layer 405. Additionally, as illustrated, a portion of fibers 410 from the fibrous layer 510 extend through the woven layer 405 to interact with the binder 710. In this way, the carpet 700 comprising the primary backing 705 and inventive secondary carpet backing 300 may possess excellent peel and tuft bind strengths.

A range of carpet styles, binders or primary carpet backings may be utilized with the current invention. For example, the carpets may include, but are not limited to, cut pile, loop pile, or cut/loop pile carpets. The face weight of the inventive carpet according to an exemplary embodiment of the invention is from about 7 ounces/sq yd to about 80 ounces/sq yd. The carpet face yarn typically comprises synthetic yarns such as nylon, polyethylene terephthalate (PET), polytrimethylene terephthalate (PTT), and polypropylene, and natural fibers such as wool or cotton. Other fiber types include polylactic acid (PLA). The primary backings may be in the form of fabrics woven from tapes, nonwoven fabrics with continuous filaments or staple fibers, or composites of woven and nonwoven fabrics. The polymers for the primary backings may be polypropylene, polyethylene, polyethylene terephthalate, polybutylene terephthatlate, or polytrimethylene terephthalate. The tapes and fibers may be of all one polymer type or bicomponent.

The inventive carpet is made using the same processes as are used for carpets made with conventional leno weave secondary backings, except that the inventive secondary backings are substituted for the conventional backings. For example, typical processes using filled latex binders are described in R. L. Scott, Journal of Coated Fabrics, Volume 19 July 1989, pp 35-52. In a common process, the tufted primary backing is contacted with about 20 to 28 ounces per square yard of filled latex (i.e., the precoat) while the secondary backing is contacted with about 8 ounces per square yard of filled latex. The binder layers are combined using a "marriage roll" at the entrance to a forced air oven. As the laminated structure moves through the oven on tenter pins, the edges are held on a tenter frame to prevent the backings from shrinking as the latex layer is dried. At the end of the oven, the carpet is passed through a cool-out box and then released from the tenter frame and wound up on a roll. Typical oven air temperatures are 300 to 350° F., and residence times are one to three minutes.

Carpets can be made with 100 percent solids binder systems as well. For example, U.S. Pat. No. 6,849,565 and British Patent 971,958 describe such carpets with a polyethylene binder system, which are incorporated herein by reference. Carpets with hot melt adhesive binder systems are described in U.S. Pat. Nos. 3,551,231; 3,684,600; 3,745,054 and 3,914,489, all of which are incorporated herein by reference. For binder systems that do not require the removal of volatiles for a curing or drying step, the composite secondary carpet backings of this invention still provide many desirable features, including high delamination strength, high dimensional stability, high seam strengths, and a textile-like back surface.

Additional features and advantages of the inventive secondary carpet backing and carpet made therefrom will be apparent to one of ordinary skill in the art from the examples that follow.

EXAMPLES

To illustrate the inventive composite secondary carpet backings 300 and carpets 700 made therefrom, a series of plain weave secondary carpet backing fabrics were woven and needlepunched with about 1 to 1.7 osy of a polypropylene fiber. Carpet samples were then formed using the inventive composite secondary carpet backings 300 of this invention as well as several other comparative secondary carpet backings.

Exemplary and Comparative Secondary Carpet Backing Fabrics

Tables I and II illustrate comparative secondary carpet backings and exemplary embodiments of the inventive composite secondary carpet backing 300. The tests used to measure certain values in Table I are as follows:

1. Thickness was measured according to ASTM D-1777-96 with a 1.1 inch presser foot.

2. Air flow rate was measured according to ASTM D-737 using a 0.5-inch water head pressure differential. 3. Grab tensile properties were measured according to ASTM D-4632.

Secondary carpet backings S1 through S9 are exemplary embodiments of the inventive secondary carpet backing 300. Secondary carpet backings Comp. 1 through Comp. 5 are shown for comparative purposes. To compile the table, a series of 152-inch wide, plain weave fabrics was woven on a projectile loom using a variety of tape yarns in the warp direction and spun yarns in the filling direction.

The warp tape yarns in all fabrics had dimensions of 1.7×48 mils except as noted. The spun yarns were made from 2.5-inch long by 4.6 denier polypropylene staple fiber using an open end spinning process. The 1265 denier spun yarn had a diameter of about 36 mils, and the 1714 denier spun yarn had a diameter of about 40 mils.

Exemplary secondary carpet backings S1, S3 through S9 and Comparative (Comp.) secondary carpet backings 1, 2, 3, and 5 were needlepunched with a web of 7 denier, 3-inch polypropylene staple fiber on a needle loom with type F-10-1-26-5NK/LI/1E 15×18×32×3 single barb needles supplied by Foster Needle Company at a needling density of about 450 penetrations per sq inch (ppsi). Exemplary secondary carpet backing S2 was needlepunched with a web of 4 denier by 3-inch polypropylene fiber in a needleloom with six barb needles supplied by Gros-Beckert USA (part number: C222 G 73012, type 15×16×36×3) at a needling density of about 150 ppsi. For all needlepunched composites, the needle penetration depth was 0.5 inches. Under these conditions, about 10% to 15% of the fibers in the web were forced through one face of the woven fabric and were visible on the opposite face. Table I summarizes the constructions of the exemplary and comparative secondary carpet backings. Table II summarizes their properties.

TABLE I

Secondary Backings

| Example | Scrim Construction | Open Area % | Fill Denier | Fiber Cap Weight (osy) | IR Post Treatment |
|---|---|---|---|---|---|
| S1 | 24 × 6 | <1 | 1265 | 1.0 | no |
| S2 | 24 × 6 | <1 | 1265 | 1.7 | yes |
| S3 | 24 × 6 | <1 | 1714 | 1.0 | no |
| S4 | 24 × 7 | <1 | 1265 | 1.0 | no |
| S5 | 28 × 6 | <1 | 1265 | 1.6 | no |
| S6 | 28 × 6 | <1 | 1714 | 1.0 | no |
| S7 | 28$^A$ × 7 | <1 | 1714 | 1.2 | no |
| S8 | 16 × 10 | 12 | 1265 | 1.2 | no |
| S9 | 16 × 12 | 8 | 1265 | 1.2 | no |
| Comp. 1 | 28 × 6 | <1 | 1260$^B$ | 1.6 | no |
| Comp. 2 | 16 × 5 leno | 34 | 1714 | 1.0 | no |
| Comp. 3 | 16 × 5 leno | 34 | 1714 | 1.0 | yes |
| Comp. 4 | 16 × 5 leno | 34 | 1714 | 0 | no |
| Comp. 5 | 16 × 8$^B$ | 2 | 1260$^B$ | 1.0 | yes |

$^A$ = tape dimensions 1.8 × 50 mils; denier 475.
$^B$ = fill yarn was a tape yarn with dimensions of 2.1 × 115 mils.

As can be understood from Table I, all of the woven scrims of the secondary carpet backings of this invention S1-S9 had open areas of 12% or less, most often less than 1%. Two of the comparative secondary carpet backings had open areas of 2% or less, while three others (Comp. 2, 3, and 4 in Table I) had woven scrims with an open area of 34%.

The IR treatment applied to exemplary secondary carpet backing S2 and comparative secondary carpet backings Comp. 3 and Comp. 5 comprised passing the needlepunched composite past a three feet long bank of infrared heaters at a line speed of about 20 to 50 ft/min. The surface temperature on the fabric at a point twelve inches past the end of the heater was between 180° and 210° F. The effect of the IR heat treatment was to lightly fuse the fibrous web on the side of the composite with the majority of the fibers. Under the IR heat treatment used for exemplary secondary carpet backing S2, there was little effect on the tensile strength or air permeability (compare exemplary secondary carpet backing S1 with exemplary secondary carpet backing S2).

As illustrated in Table I above, Comp. 1 was equivalent to exemplary secondary carpet backing S5 except for the fill yarn. In Comp. 1, a flat tape yarn replaced the 1265 denier spun yarn in inventive secondary carpet backing S5. Comp. 2 contained a 16×5 leno weave fabric described in the prior art. The woven scrim in Comp. 2 differed from the woven scrim of the exemplary secondary carpet backings in that it had a leno weave and a much higher open area. Comp. 3 was identical to Comp. 2 except that it had been subjected to IR treatment. Comp. 4 was the 16×5 scrim of the prior art without a fibrous cap. Comp. 4 is available commercially as ActionBac®, style 3865 secondary carpet backing from Propex Fabrics Inc. Comp. 5 was similar to Comp. 1; both woven fabrics had tape yarns in the filling direction. In Comp. 5, the number of picks/inch was higher than in Comp. 1, leading to higher fill coverage.

TABLE II

Secondary Backing Properties

| Example | Unit Weight (osy) | Thickness (mils) | Air Flow Rate (cfm/ft$^2$) | Grab Tensile Strength (lbs) Warp | Grab Tensile Strength (lbs) Fill | Grab Tensile Elongation (%) Warp | Grab Tensile Elongation (%) Fill |
|---|---|---|---|---|---|---|---|
| S1 | 3.4 | 38 | 315 | 95 | 39 | 25 | 40 |
| S2 | 3.5 | 38 | 307 | 115 | 30 | 28 | 47 |
| S3 | 3.7 | 43 | 331 | 96 | 43 | 26 | 39 |
| S4 | 3.6 | 44 | 328 | 102 | 44 | 30 | 41 |
| S5 | 4.2 | 54 | 336 | 79 | 33 | 19 | 39 |
| S6 | 3.9 | 46 | 295 | 116 | 43 | 26 | 39 |
| S7 | 4.8 | 53 | 360 | 127 | 60 | 36 | 40 |
| S8 | 3.9 | 43 | 310 | 65 | 60 | 24 | 41 |
| S9 | 3.9 | 39 | 264 | 72 | 67 | 25 | 41 |
| Comp. 1 | 4.3 | 45 | 128 | 58 | 60 | 13 | 24 |
| Comp. 2 | 3.2 | 44 | 626 | 48 | 36 | 19 | 42 |
| Comp. 3 | 3.2 | 41 | 785 | 85 | 62 | 24 | 31 |
| Comp. 4 | 2.2 | 35 | 865 | 72 | 39 | 37 | 45 |
| Comp. 5 | 3.7 | 26 | 65 | 100 | 100 | 28 | 35 |

Some woven fabrics were tested for tensile properties prior to needlepunching with fiber. For example, the grab tensile strength of the woven fabric in the composite backing of exemplary secondary carpet backing S7 was 144 lbs in the warp direction and 51 lbs in the fill direction prior to needlepunching. The results in Table II, which were measured subsequent to needlepunching, indicate that the strength of the fabrics of this invention were not radically degraded after needlepunching with fiber.

As illustrated in Table II, exemplary secondary carpet backings S1 through S9 of this invention had air flows above 250 cu ft/sq ft/min and open areas less than 15%, preferably less than 12%. Conversely, the comparative secondary carpet backings Comp. 1 through Comp. 5 had either: a) high air flow with high open area, or b) low air flows with low open area. However, as discussed previously, a) is unsatisfactory because of poor aesthetics and abrasiveness of the finished carpet and b) is unsatisfactory because it leads to low carpet properties. Accordingly, it is surprising that the exemplary secondary carpet backings of this invention, which possess an unexpected combination of low open area and high air permeability, are capable of imparting both excellent carpet properties and appealing, textile-like surfaces.

As illustrated in the carpet examples that follow, it is also surprising and unexpected that the exemplary secondary carpet backings of this invention perform so well in making carpets with excellent physical properties and an appealing, textile-like surface at high line speeds. As will be illustrated below, none of the comparative secondary carpet backings produced carpets that had fully satisfactory physical properties (e.g., tuft bind, cyclic dimensional stability, and peel strength) in combination with a uniform, non abrasive textile-like appearance.

Carpets

The exemplary and comparative secondary carpet backings of Tables I and II were next used to make carpets. These results are illustrated in Tables III and IV below. The tests used to measure certain values in Tables III and IV are as follows:

1. Delamination strength (i.e., peel strength) of the secondary carpet backing was measured according to ASTM D-3936-00.
2. Tuft bind on the carpet samples was measured according to ASTM D-1335.

3. Dimensional stability was measured via a cyclic test described in British Standard 4682: Part 1, 1971. In this test, a 2-inch wide strip of carpet was loaded with 1 pound to 45 pounds in tension and then unloaded back to 1 pound. This cycle was repeated ten times. Several properties were measured, including "unrecovered extension," which is the difference in the strain at the first loading to 1 pound and the strain at the tenth loading to 1 pound, and "total extension," which is the difference between the strain at the first loading to 1 pound and the strain at the tenth loading to 45 pounds. Publications such as "Dimensional Stability of Carpets: Rucking of Carpets in Use," Sudnik, Z. M., Textile Inst. and Ind., 7, 278-281 (1969) and "The Dimensional Stability of Carpets in Installations, Part I: Stability to Mechanical Actions" Gentry, D. R., Textile Research Journal 47 (1977) confirm that the sum of unrecovered extensions in the warp and fill directions should be less than 2% for carpets considered to have very good dimensional stability. The research of the present inventors has also indicated that good dimensional stability also requires the sum of the total extensions for the warp and fill directions be less than 8%.

Exemplary Carpet C1

To make exemplary carpet C1, a 38 osy nylon cut pile tufted primary backing with 0.6 inch pile height, 5/32 gauge, and 7 stitches per inch was laminated to exemplary secondary carpet backing S2 using a filler/binder mixture consisting of 450 parts by weight of calcium carbonate filler with 100 parts of styrene-butadiene latex solids. The lamination process was carried out at a line speed of about 50 ft. per min in a 100 ft. long forced air oven with an internal air temperature of about 340° F. Several comparative secondary carpet backings were also laminated with a primary backing as described above with carpet C1. Specifically, comparative secondary carpet backings Comp. 3, Comp. 4 and Comp. 5 were used to make comparative carpets Comp. 1, Comp. 2, and Comp. 3, respectively.

The tufted primary backing for all carpet samples had a nominal weight of 3.0 osy and was similar to PolyBac® style 2200 primary backing sold by Propex Fabrics Inc. The primary backing fabric had a 24×11 closed weave construction. The secondary carpet backing samples were run back-to-back to minimize differences in processing conditions. The results of tests on the finished carpets appear in Table III.

the tuft bind requirements for cut pile carpet installed in homes qualifying for financing through the US Dept of Housing and Urban Development (HUD). The minimum requirement is 3.0 lbs for tuft bind on cut pile carpets.

The cyclic dimensional stability of the carpet C1 was essentially the same as that of the carpet in Comparative Example 2 in Table III. The latter carpet was made with the most common secondary carpet backing used to make carpets today. All carpets in Table III had fully satisfactory cyclic dimensional stability performance as measured by both unrecovered extension and total extension.

The carpets in exemplary carpet C1 and comparative carpets 1 and 2 in Table III had peel strengths (i.e., delamination strengths) above the minimum requirement for HUD financing (2.5 lbs/inch). In fact, exemplary carpet C1 had outstanding peel strength—higher than any of the comparative carpets. In addition, the carpet in comparative carpet 3 had very low delamination strength (0.9 lbs). This level of performance is below the minimum requirement for HUD-financed homes and below industry norms.

The other two comparative carpets in Table III had deficiencies that were not observed in the carpets of this invention. Comparative carpet Comp. 2 had a secondary carpet backing comprising a 16×5 open mesh scrim with no fiber cap. The back of this carpet was abrasive and lacked a textile-like appearance. Comparative carpet Comp. 1 had a secondary carpet backing with the same open mesh scrim as in the secondary carpet backing of comparative carpet 2. However in Comp. 1, a layer of polypropylene fiber had been needled into the scrim to make a composite secondary carpet backing. Despite this, the appearance and abrasiveness of the back side of comparative carpet Comp. 1 was very similar to that of Comp. 2 because the fibers had almost completely melted when the latex was dried in the oven. Consequently the appearance of the secondary carpet backing on comparative carpet Comp. 1 was not satisfactory.

The exemplary carpets of this invention had a combination of excellent physical properties (tuft bind, cyclic dimensional stability, and peel strength) and a textile-like and non-abrasive backing surface. It was unexpected that the secondary carpet backings of this invention were more tolerant of high

TABLE III

CARPET PROPERTIES

| Carpet Example | Secondary Backing | Total Weight (osy) | Delamination Strength (lbs/in) | Cyclic Dimensional Stability (%) | | | | | | Tuft Bind (lbs) |
|---|---|---|---|---|---|---|---|---|---|---|
| | | | | Total Extension | Warp | Fill | Unrecovered Extension | Warp | Fill | |
| C1 | S2 | 71 | 7.6 | 6.8 | 2.5 | 4.3 | 1.0 | 0.4 | 0.6 | 5.9 |
| Comp. 1 | Comp. 3 (Table I) | 71 | 3.6 | 5.2 | 2.6 | 3.6 | 1.1 | 0.5 | 0.6 | 5.6 |
| Comp. 2 | Comp. 4 (Table I) | 67 | 6.0 | 6.7 | 3.1 | 3.6 | 1.0 | 0.5 | 0.5 | 4.4 |
| Comp. 3 | Comp. 5 (Table I) | 70 | 0.9 | 5.4 | 2.3 | 3.1 | 0.8 | 0.4 | 0.4 | 5.8 |

The data in Table III illustrates that exemplary carpet C1 had better tuft bind than the carpets in comparative carpets Comp. 1, Comp. 2, and Comp. 3. All carpets easily exceeded temperatures in carpet curing ovens than prior art composite secondary carpet backings that have a 16×5 open leno weave scrim.

Exemplary Carpets C2, C3, and C4

To make exemplary carpets C2, C3, and C4, a 29 osy nylon cut pile tufted primary backing with 0.5 inch pile height, 3/16 gauge, and 7 stitches per inch was laminated to a secondary carpet backing using a filler/binder mixture consisting of 425 parts by weight of calcium carbonate filler with 100 parts of styrene-butadiene latex solids. The lamination process was carried out at a line speed of about 65 ft. per min in a 67 ft. long forced air oven with an internal air temperature of about 360 degrees F. Several comparative secondary carpet backings were also laminated with the tufted primary backing as described above with exemplary carpets C2, C3, and C4. Specifically, comparative secondary carpet backings Comp. 1 and Comp. 2 were used to make comparative carpets Comp. 4 and Comp. 5, respectively.

The primary backing for all carpet samples had a nominal weight of 3.3 osy and was similar to PolyBac® style 2205 primary backing sold by Propex Fabrics Inc. The primary backing fabric had a 24×13 closed weave construction. The secondary carpet backing samples were run back-to-back to minimize differences in processing conditions. The results of tests on the finished carpets appear in Table IV.

TABLE IV

Carpet Properties

| Carpet Example | Secondary Backing | Total Weight (osy) | Delamination Strength (lbs/inch) | Cyclic Dimensional Stability (%) | | | | | | Tuft Bind (lbs) |
|---|---|---|---|---|---|---|---|---|---|---|
| | | | | Total Extension | Warp | Fill | Unrecovered Extension | Warp | Fill | |
| C2 | S5 | 56 | 3.9 | 5.9 | 2.6 | 3.3 | 1.2 | 0.5 | 0.7 | 4.6 |
| C3 | S6 | 53 | 4.2 | 5.4 | 2.4 | 3.0 | 0.9 | 0.4 | 0.5 | 4.7 |
| C4 | S8 | 57 | 6.1 | 6.7 | 3.4 | 3.3 | 11 | 0.6 | 0.5 | 5.8 |
| Comp. 4 | Comp. 1 (Table I) | 51 | 0-4.2[A] | 5.7 | 2.7 | 3.0 | 1.0 | 0.5 | 0.5 | 4.7 |
| Comp. 5 | Comp. 2 (Table I) | 51 | 5.1 | 6.5 | 3.2 | 3.3 | 1.1 | 0.6 | 0.5 | 5.0 |

[A] = Sections of the secondary backing separated from the tufted primary during lamination in the oven All of the exemplary carpets C2, C3, and C4 in Table IV exceeded the minimum requirements for physical properties (tuft bind>3.0 lbs; cyclic dimensional stability-total extension (warp+fill)<8% and unrecovered extension (warp+fill) <2%; and peel strength>2.5 lbs/inch). In some cases, such as with exemplary carpet C4, the peel strength (6.1 lbs/inch) was superior to that in all other carpets made during this trial. Similarly, exemplary carpet C3 had the best performance in the cyclic dimensional stability test of all carpets, and the tuft bind of exemplary carpet C4 (5.8 lbs) was superior to that of both comparative example carpets. These results are unexpected, especially because prior art teachings regarding secondary carpet backings indicate that an open weave scrim is required for good carpet properties.

Comparative carpet Comp. 4 in Table IV did not meet all physical property requirements. Specifically, peel strength varied from zero lbs/inch to 4.2 lbs/inch. The zero lbs/inch reading was due to the fact that large sections of the secondary carpet backing fell off when the carpet was cured in the oven. Such nonuniform properties are not acceptable in carpets that are sold to residential or commercial customers.

Comparative carpet Comp. 5 in Table IV also did not meet all requirements. Although tuft bind, cyclic dimensional stability, and peel strength were satisfactory, the back side of the carpet was rough and open because the staple fiber in the composite secondary carpet backing melted when the carpet latex was cured. In contrast, the fibrous layers on the secondary carpet backings of exemplary carpets C2, C3, and C4 did not melt to any significant extent during latex curing. This result was unexpected, since these fibers had the same chemical composition as those on the back of comparative carpet 5 of Table IV. Notably, the minimal open area construction of the exemplary carpets created unexpected air flow allowing for the removal of water at a sufficient rate to keep the fibrous layers from melting, despite the fact that the similar fibrous layers were used in the comparative carpets. Accordingly, the high air flow despite the low open area in the woven scrims of the secondary backings of the exemplary carpets C2, C3, and C4 leads to other unexpected results, such as the ability to withstand rigorous latex curing without causing the fibrous layer to melt.

The foregoing description and drawings comprise illustrative embodiments of the present invention. Having thus described exemplary embodiments of the present invention, it should be noted by those skilled in the art that the disclosures within are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will become apparent to one skilled in the art having the benefit of the teachings presented herein. Although specific terms may be employed herein, they are used in a generic and descriptive sense only and not for purposes of limitation. Accordingly, the present invention is not limited to the specific embodiments illustrated herein, but is limited only by the following claims.

What is claimed is:

1. A carpet consisting of:
   a primary backing;
   face yarn consisting of a plurality of filaments tufted through the primary backing; and
   a binder layer adhering a stitched side of the primary backing to a secondary backing, said secondary backing consisting of:
      a woven fabric layer having a flat weave which comprises at least one of a plain, satin, and twill weave construction of tape yarns in a warp direction interwoven with multifilament yarns in a filling direction, said woven fabric layer having an open area of about 15% or less, said multifilament yarns having a thickness that is at least three times the thickness of warp tapes such that gaps are formed at crossover regions formed by the multifilament yarns and warp tapes; and a fibrous layer, wherein said fibrous layer weighs between about 0.5 osy and about 10 osy, and wherein at least a portion of said fibers have penetrated through said woven fabric layer and extend outward from a side thereof; and wherein said secondary backing has an air permeability of greater than about 220 cfm/sq ft.

2. The carpet of claim 1, wherein said multifilament fill yarn in the woven fabric layer of the secondary carpet backing comprises one of the following groups of yarns: open end spun yarn, ring spun yarn, bulked continuous spun yarn, and core-spun yarn.

3. The carpet of claim 1, wherein said fill and said warp yarn comprise at least one of the following materials: polypropylene, polyester, polyamide, and polyethylene.

4. The carpet of claim 1, wherein said portion of said fibers that penetrate said woven fabric layer and extend outward from a side thereof comprise at least 5% by weight and no more than 95% by weight.

5. The carpet of claim 1, wherein the woven fabric layer in the secondary carpet backing has a plain weave construction with 24 wpi×6 ppi.

6. The carpet of claim 1, wherein some of the fibers penetrating through the woven fabric layer and extending outward are fused together.

* * * * *

UNITED STATES PATENT AND TRADEMARK OFFICE
CERTIFICATE OF CORRECTION

| | | |
|---|---|---|
| PATENT NO. | : 7,670,660 B2 | |
| APPLICATION NO. | : 11/362700 | |
| DATED | : March 2, 2010 | |
| INVENTOR(S) | : Gardner et al. | |

Figure 1:
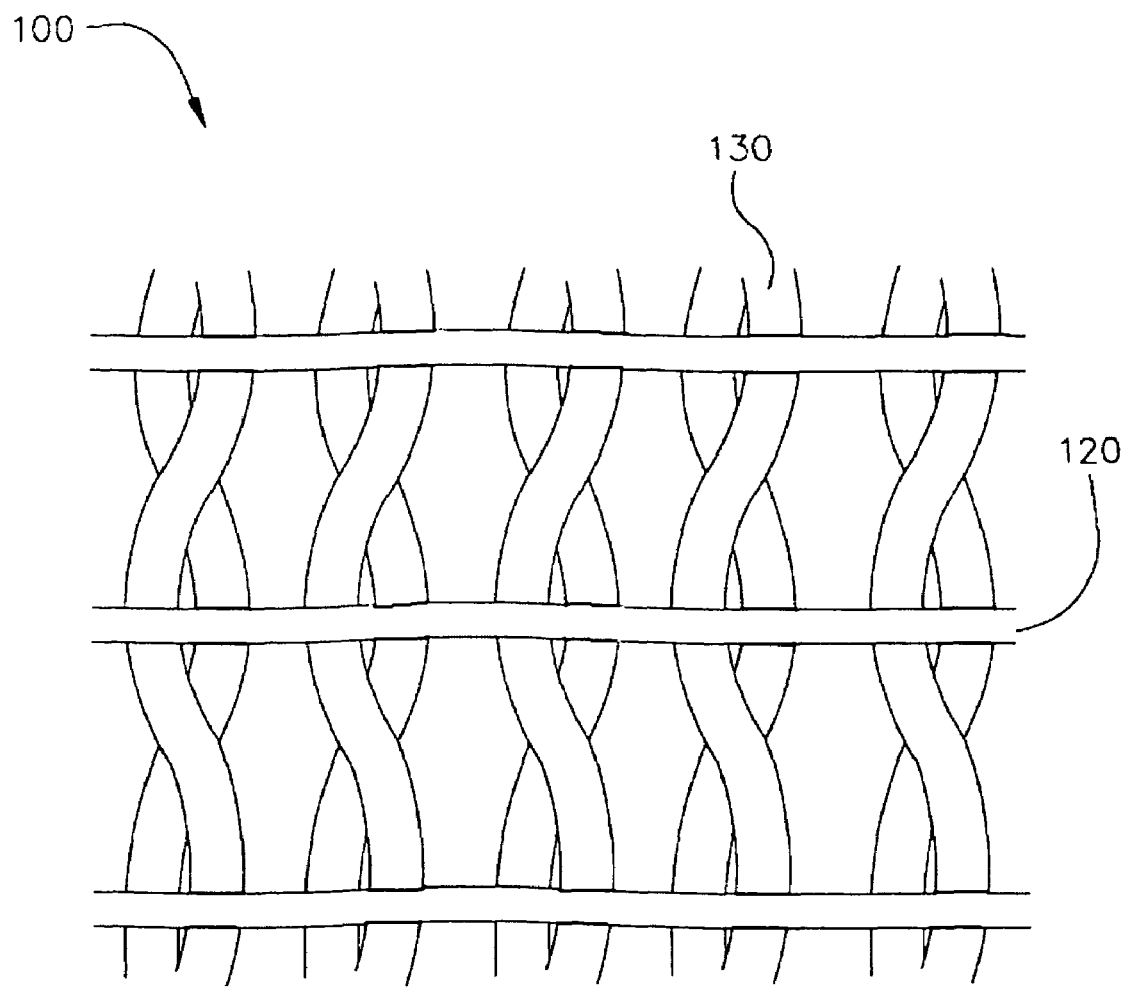
FIG. 1 is a photographic top view of an open weave scrim in a 16 wpi by 5 ppi construction according to the conventional art.
Figure 2:
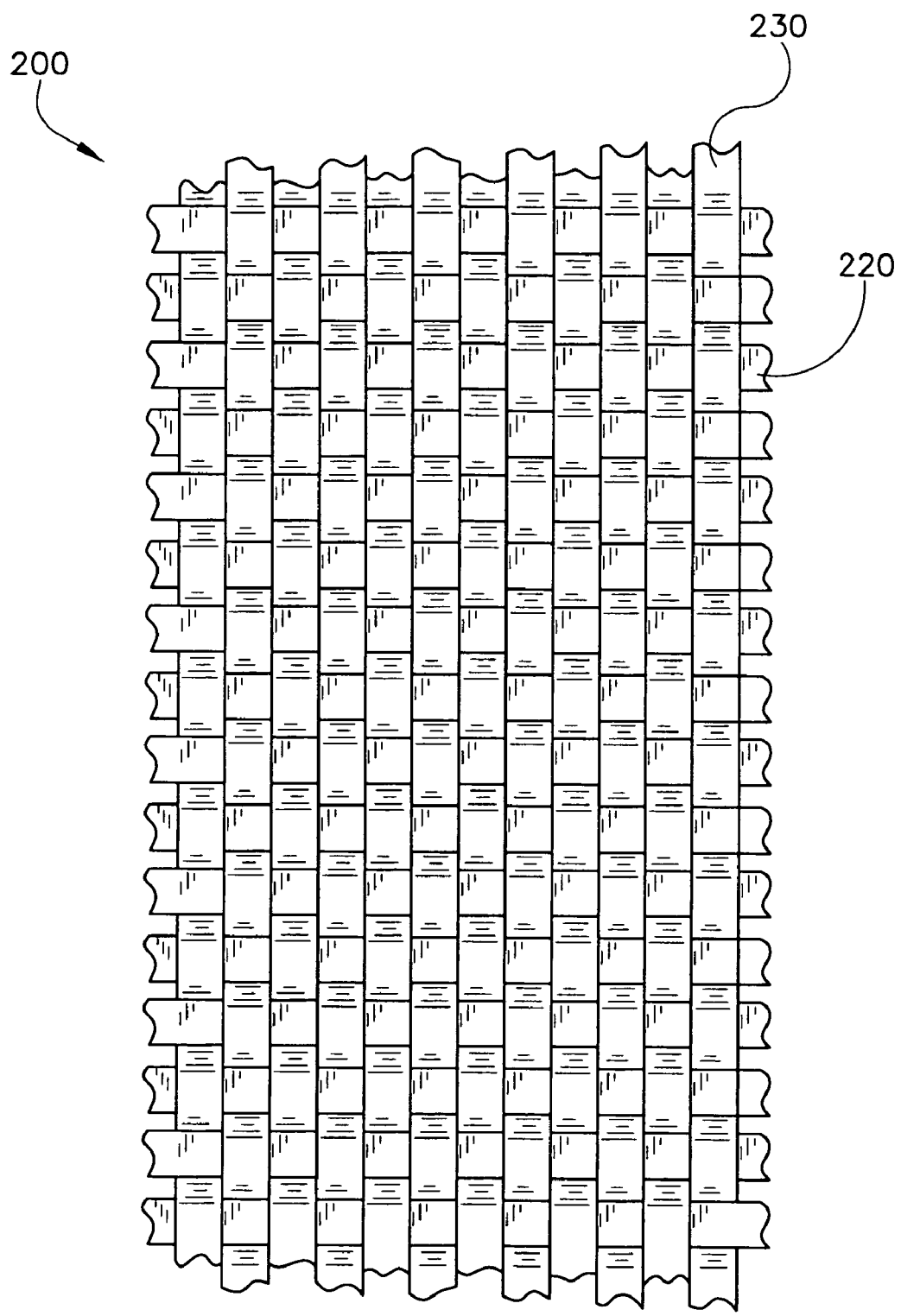
FIG. 2 is a top view of a secondary carpet backing of the prior art with low air permeability and low open area.

It is certified that error appears in the above-identified patent and that said Letters Patent is hereby corrected as shown below:

The drawing sheet consisting of Fig. 1, should be deleted to be replaced with the drawing sheet, consisting of Fig. 1 as shown on the attached page Signed and Sealed this
First Day of February, 2011

David J. Kappos
*Director of the United States Patent and Trademark Office*